Dec. 7, 1926.
C. W. DONHOLT
1,610,204
FISHING PLUG
Filed May 11, 1925
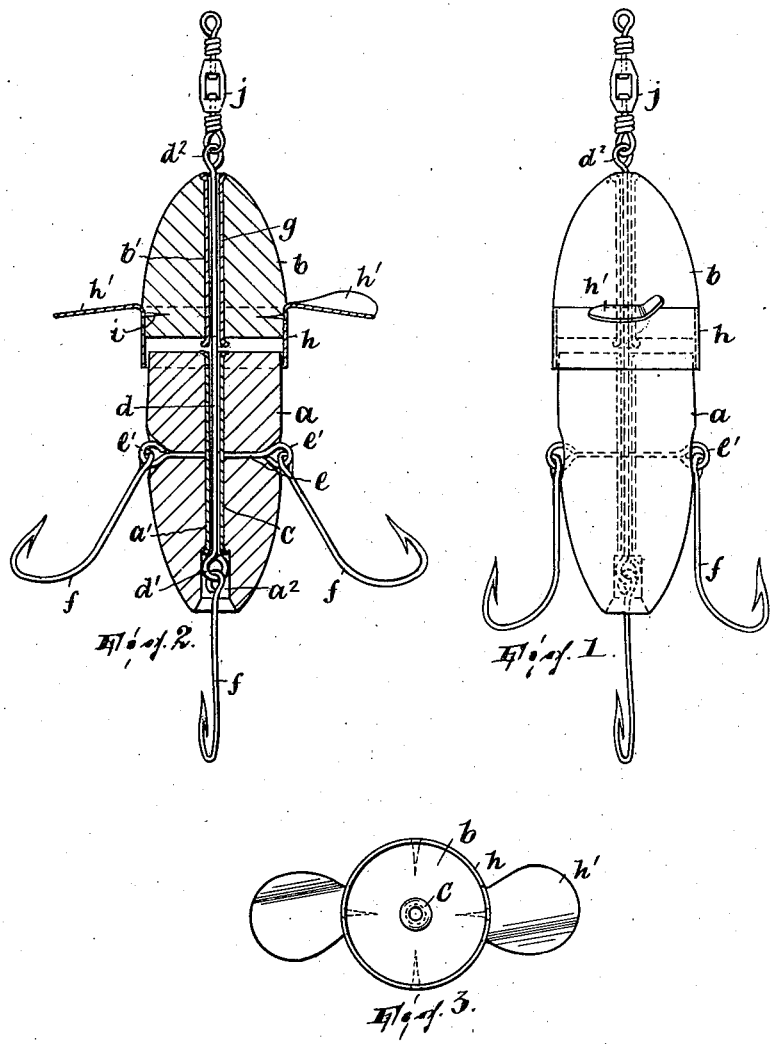
WITNESS
Wm L Bell
INVENTOR,
Charles W. Donholt,
BY
John Leeward
ATTORNEY.

Patented Dec. 7, 1926.

1,610,204

UNITED STATES PATENT OFFICE.

CHARLES W. DONHOLT, OF MIDLAND PARK, NEW JERSEY.

FISHING PLUG.

Application filed May 11, 1925. Serial No. 29,330.

This invention relates to fish lures and it has for its principal object to provide a lure of the rotary propeller type which shall be proof against the catching of grass or weeds between the rotary and fixed parts thereof and at the same time shall be inexpensive to manufacture and so constructed that its rotary part will be quite sensitive to rotation when the device is drawn through the water.

In the drawing,

Fig. 1 is a side elevation of the device;

Fig. 2 is a longitudinal central sectional view thereof; and

Fig. 3 is a rear elevation of the head or rotating member thereof.

There are two main parts to the lure, the relatively fixed or non-rotating after body part $a$ and the rotary forward body part $b$. Both parts may be made of wood and they respectively have their rear and forward ends rounded as shown and their adjoining ends cut off square.

The member including the rearward part $a$ has an axial bore $a'$ in which is tightly fitted a metal tube $c$ having both ends upset, as shown, the rear end coinciding with the bottom or forward end of a hole $a^2$ drilled axially into part $a$ from the rear. This member also includes a stem or wire $d$ which extends through the tube $c$, having its end formed with eyes $d'$ $d^2$, the end having eye $d'$ being jammed into the hole $a^2$ so that the stem cannot turn with respect to part $a$ and the other end protruding from the tube. Attached to this member, as to the eye $d'$ and to the end eyes $e'$ of a cross-wire $e$ penetrating part $a$, are the hooks $f$.

The member including the forward part $b$ also has an axial bore $b'$ in which is tightly fitted a metal tube $g$ having both ends upset, as shown, the rear end protruding slightly from the bore and the other end being flush with the forward end of part $b$. This member also includes a device which telescopes over the part $a$ and has the propeller blades or fins for effecting its rotation. This device, $h$, is a metal sleeve which may be formed from tubing having suitably shaped opposite integral projections $h'$ which are bent outwardly and to the proper pitch to serve as the propellers. It fits snugly the rear end of part $b$ so as to project rearwardly therefrom and may be secured in place by brads or pins $i$, which it is preferable to introduce directly behind the propellers. The sleeve projects rearwardly somewhat further than the tube $g$.

The two members are assembled by slipping the forward member over the projecting forward end portion of the stem $d$ before its forward eye $d^2$ has been formed. In this arrangement the projecting part of the sleeve of the forward or rotating member overlaps or telescopes the other member, as shown, this relation being permanently maintained by the eye $d^2$. Said projecting part or skirt of the sleeve thus serves to prevent grass or weeds from having access between the members so that any fouling of the lure in that way is entirely prevented.

It will be noted that the tubes $c$ and $g$ bear against each other and that since the latter tube $g$ projects from the forward member $a$ metal-to-metal contact or thrust bearing is afforded, avoiding the face-to-face contact of parts $a$ and $b$ and consequently so appreciably reducing the friction that would otherwise exist that the forward member will spin with perfect freedom.

$j$ is simply a swivel or other connection attached to eye $d^2$ and serving as means to connect the lure to the line.

Having thus fully described my invention what I claim and desire to secure by Letters Patent is:

In a fish lure, the combination of a relatively fixed rearward member having a forwardly projecting axial stem, and a forward member revoluble on said stem and having propelling means, each member having an axial tube fixed therein and one tube projecting and abutting the other and thereby forming a thrust bearing between the members.

In testimony whereof I affix my signature.

CHARLES W. DONHOLT.